United States Patent [19]

Hicks, III

[11] Patent Number: 5,760,824
[45] Date of Patent: Jun. 2, 1998

[54] MULTIMEDIA TELEPHONE HAVING WIRELESS CAMERA AND TELEVISION MODULE AND METHOD OF OPERATION THEREOF

[75] Inventor: John Alson Hicks, III, Ocean, N.J.

[73] Assignee: Lucent Technologies Inc., Murray Hill, N.J.

[21] Appl. No.: 581,661

[22] Filed: Dec. 29, 1995

[51] Int. Cl.⁶ .................................................. H04N 7/12
[52] U.S. Cl. ................ 348/14; 455/6.3; 455/556
[58] Field of Search .................... 348/14–20, 373, 348/375, 376; 379/96–99, 110, 110.01, 93.17; 455/5.1, 6.2, 6.3, 556, 557

[56] References Cited

U.S. PATENT DOCUMENTS

| | | | |
|---|---|---|---|
| 5,204,893 | 4/1993 | Choi et al. | 379/53 |
| 5,257,306 | 10/1993 | Watanabe | 379/53 |
| 5,282,028 | 1/1994 | Johnson et al. | 358/86 |
| 5,305,100 | 4/1994 | Choi | 348/159 |
| 5,318,257 | 6/1994 | Tani | 348/14 |
| 5,327,231 | 7/1994 | Krummey et al. | 348/79 |
| 5,351,076 | 9/1994 | Hata et al. | 348/14 |
| 5,373,288 | 12/1994 | Blahut | 340/825.08 |
| 5,400,068 | 3/1995 | Ishida et al. | 348/14 |
| 5,528,285 | 6/1996 | Morikawa et al. | 348/14 |

FOREIGN PATENT DOCUMENTS 5-199328  8/1939  Japan ........................................ 348/14

Primary Examiner—Wing F. Chan

[57] ABSTRACT

For use with a video camera, a television set and a communications network capable of carrying voice and video data, a multimedia telephone that includes a network interface for coupling the multimedia telephone to the communications network. The multimedia telephone further includes a first module, coupled to the network interface and including a user interface for communicating audio information with a user and first module wireless communication circuitry. The multimedia telephone still further includes a second module separable from the first module, coupled to the network interface and including a video input, connectible to the video camera, for receiving video information from the video camera, a video output, connectible to the television set, for transmitting other video information to the television set, and second module wireless communication circuitry coupled to the camera input and the television output and wirelessly couplable to the first module wireless communication circuitry. The first and second module wireless communication circuitry cooperate to establish a wireless communication link between the first and second modules. The multimedia telephone is embodied in the first and second modules to allow the first module to be separate from the second module and proximate the user.

20 Claims, 6 Drawing Sheets

MULTIMEDIA TELEPHONE HAVING WIRELESS CAMERA AND TELEVISION MODULE AND METHOD OF OPERATION THEREOF

TECHNICAL FIELD OF THE INVENTION

The present invention is directed, in general, to videotelephony and, more specifically, to a modular multimedia telephone including a wireless video camera and television module and a method of operation thereof.

BACKGROUND OF THE INVENTION

Traditionally, voice and video communication systems have been largely bifurcated. Conventional telephone systems, operating at a bandwidth appropriate for voice communications, typically provide point-to-point voice and data services to subscribers, while television systems (including cable television systems), operating at a much broader bandwidth, are usually employed to broadcast high quality, full-motion video and audio to consumers.

It has long been felt that if the best features of voice and video communication systems could be combined appropriately, fully interactive videotelephony would become feasible. Accordingly, given its apparent advantages, videotelephony has been the subject of commercial development for many years.

Although the first videophone appeared as early as the 1930s, AT&T demonstrated the first practical videophone (the "Picturephone®") at the 1964 World's Fair in New York City. To many, the Picturephone® appeared to fulfill the promises of interactive videotelephony. More recently in 1992, AT&T introduced the Videophone 2500, which operates over analog telephone lines.

Generically, videophones provide point-to-point, interactive communication of synchronized voice, video and data information simultaneously over a single transmission line, either analog or digital, such as an Integrated Service Digital Network ("ISDN1"). Conventional videophones include, in a single, unitary structure: a network interface, a telephone for communicating voice information, a videophone controller for controlling the functions of the videophone, a camera for capturing video for transmission, a display monitor for displaying received video and an audio/video coder/decoder ("CODEC") for digitally compressing and decompressing audio and video input. The CODEC compresses the video received from the camera and the audio received from the telephone. The resulting signal passes through the network interface for transmission across the network. The CODEC also decompresses digitally-compressed input received from the network via the network interface. After decompression, the video output is transmitted from the CODEC to the display monitor and the audio output is transmitted to the telephone. The telephone includes a handset/speakerphone, a 12-key dial or key pad unit for entering telephone numbers and a hook switch.

Unfortunately, neither the AT&T Videophone 2500 nor any other videophone has been a success in the marketplace. In large part, its relatively costly camera and display monitor components have placed it out of the reach of most consumers.

In an effort to reduce the cost of videophones to a more acceptable level, manufacturers have used display monitors that are as small as possible. Even with such a compromise, videophones have yet to attain a reasonable introductory price. Videophones have thus failed to attract enough purchasers to enjoy economies of scale in manufacturing and resulting decreases in the cost of cameras and display monitors. Additionally, the present videophones do not adequately support interfaces to networks carrying multimedia information, such as the Internet.

Because of the high cost of the above-described videophones and their relatively small display monitors, the undiminished interest in interactive videotelephony has led to the exploration of concepts for delivering videotelephony to consumers via a standard television set. One concept for such service provides a unitary, digital "set-top" box, including a videophone controller, a user interface/graphics character generator and an audio/video CODEC, coupled to a set-top camera by a cable for video input and a conventional television set by another cable for video output. A microphone, also coupled to the set-top box, and the television's existing speakers provide the audio input and output, respectively. Finally, the digital set-top box provides a remotely-controllable user interface via the television's screen using an infrared remote control device.

The digital set-top box approach described above avoids the cost considerations and small display compromises of videophones by employing the consumer's existing, conventional television set. Consumers can therefore enjoy the benefits of high quality videotelephony without having to purchase a dedicated display monitor.

Unfortunately, the current digital set-top box approach suffers from several significant disadvantages. First, the dialing interface is handled unnaturally through an infrared remote control device. Second, the television's speakers (providing the audio output) are unnatural to use, compared to a handset, and also fail to lend the often-desired privacy.

Accordingly, what is needed in the art is a multimedia telephone that employs a standard video camera and a user's existing television set to reduce the cost of such multimedia telephone, but that otherwise offers the user interface advantages of a conventional telephone.

SUMMARY OF THE INVENTION

To address the above-discussed deficiencies of the prior art, the present invention provides a modular multimedia telephone for use with a video camera, a television set and a communications network capable of carrying voice and video data. The multimedia telephone includes: (1) a network interface for coupling the multimedia telephone to the communications network, (2) a first module, coupled to the network interface and including a user interface for communicating audio information with a user and first module wireless communication circuitry and (3) a second module separable from the first module, coupled to the network interface. The second module includes: (a) a video input, connectible to the video camera, for receiving video information from the video camera, (b) a video output, connectible to the television set, for transmitting video information to the television set and (c) second module wireless communication circuitry coupled to the camera input and the television output and wirelessly couplable to the first module wireless communication circuitry. The first and second module wireless communication circuitry cooperate to establish a wireless communication link between the first and second modules. The multimedia telephone is embodied in the first and second modules to allow the first module to be separate from the second module and proximate the user.

Thus, the present invention introduces a multimedia telephone having a user interface, a network interface, a video input for coupling to a camera and a video output for coupling to a television set. These components and optional other components of the multimedia telephone may be contained in either one of the first or second modules, as desired. The multimedia telephone of the present invention is therefore capable of taking any one of several different forms.

The present invention further provides audio privacy and dialing interface features of an ordinary telephone and enhanced display monitor quality through a conventional television set. The present invention accomplishes this combination by dividing the multimedia telephone into first and second modules and introducing a wireless link between the modules to allow communication of information therebetween. The multimedia telephone includes, without limitation, any communication device (e.g., videophone) that can facilitate fully interactive communication of multimedia information (e.g., voice, video and/or data) over networks that carry multimedia information.

In one embodiment of the present invention, the network interface is associated with the first module and the wireless communication link is a wireless video communication link. In this embodiment, the first module appears much as a conventional telephone, and may be thought of as primarily containing the "intelligence" of the multimedia telephone. The first module "telephone" couples to the network and preferably is proximate the user. The first module sends video information to, and receives video information from, the second module (e.g., a relatively unintelligent, "set-top"-type box).

Alternatively, the network interface may be associated with the second module. In this alternative embodiment, the wireless communication link preferably becomes an audio control and signaling link, allowing the first module to remain proximate the user. In this embodiment, the second module takes the form of an intelligent "set-top"-type box. The first module preferably resembles the mobile portion of a conventional cordless telephone (perhaps with additional cursor controls or the like). The user is free to move about during a conversation; the wireless link operates to maintain constant two-way audio contact between the first and second modules.

In one embodiment of the present invention, the multimedia telephone further comprises: (1) a user interface for communicating audio information with the user and (2) a key pad unit interface for receiving dialing information from the user. The user interface is preferably proximate the user, thereby enhancing privacy of the audio information. The key pad unit interface may be a remotely-controlled interface employing the television's screen for a display, and thereby be associated with the second module. More preferably, however, the key pad unit interface is associated with the first module and is proximate the user to retain the familiar interface of conventional telephones.

In one embodiment of the present invention, one of the first and second module wireless communication circuitry is coupled to CODEC circuitry. The CODEC circuitry provides desirable audio and video compression and decompression.

In one embodiment of the present invention, the user interface comprises a handset. The handset, a staple of conventional telephones, is a familiar interface for users and provides enhanced privacy for conversations. Alternatively, the multimedia telephone may use a hands-free interface, such as found on conventional speakerphones. The user interface may also include cursor controls, or the like, as appropriate.

In one embodiment of the present invention, the wireless communication link is a radio frequency ("RF") link. As those of ordinary skill in the art are aware, relatively low-power RF transmitters and receivers are commercially available at reasonable prices and provide reliable short-range communication of information.

In one embodiment of the present invention, the video camera is contained in a chassis separate from the second module. Alternatively, the camera may be integral with the second module, thereby providing a compact, preferably "set-top" type box.

A more particular embodiment of the present invention provides a multimedia telephone for use with a video camera, a television set and a communications network capable of carrying voice and video data. The multimedia telephone comprises: (1) a first module including: (1a) a user interface for communicating audio information with a user, (1b) a network interface, coupled to the user interface, for coupling the main module to the communications network and (1c) first module wireless communication circuitry, coupled to the network interface, for wirelessly communicating video information.

The multimedia telephone further comprises: (2) a second module separable from the first module and including: (2a) a video input, connectible to the video camera, for receiving video information from the video camera, (2b) a video output, connectible to the television set, for transmitting video information to the television set and (2c) second module wireless communication circuitry coupled to the camera input and the television output and wirelessly couplable to the first module wireless communication circuitry. This embodiment places the primary intelligence of the multimedia telephone in the first module and will be the embodiment illustrated and described in the Detailed Description to follow. However, those of ordinary skill in the pertinent art should understand that the various constituent components may be otherwise distributed between the first and second modules, as long as the desired components are present in at least one of the first and second modules.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
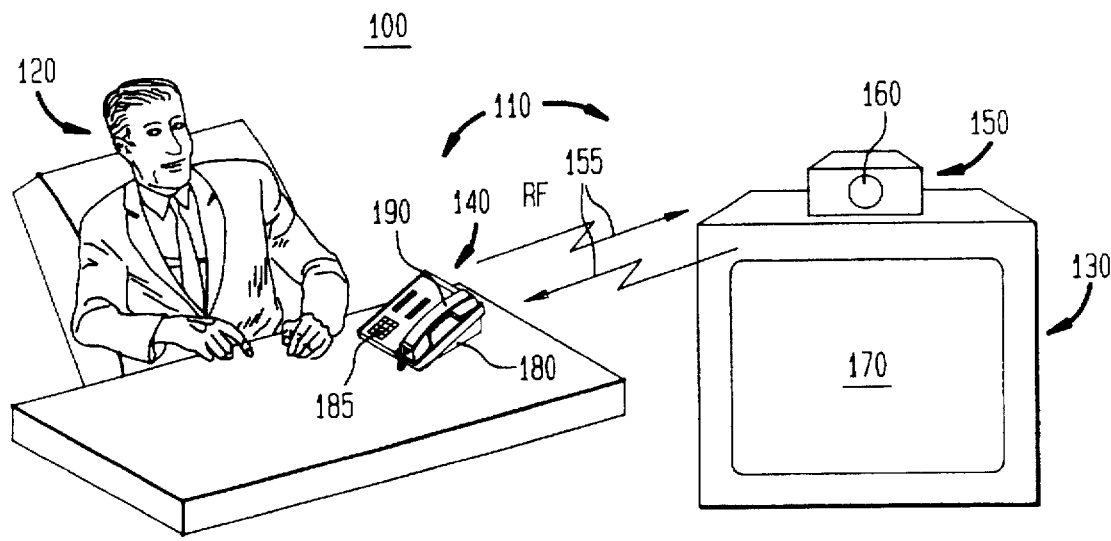
FIG. 1 illustrates a perspective view of an interactive system employing a multimedia telephone according to the principles of the present invention.

Referring initially to FIG. 1, illustrated is a perspective view of an interactive system 100 employing a multimedia telephone 110 according to the principles of the present invention. The multimedia telephone 110 allows a user 120 to employ a standard television set 130 for videotelephony. The multimedia telephone 110 includes first and second modules 140, 150 having wireless communications circuitry (see FIG. 2) to carry analog video via a radio frequency ("RF") link 155 between the first and second modules 140, 150. While the illustrated embodiment introduces an RF wireless communication link 155, other communications circuitry and links capable of supporting wireless communication between the first and second modules 140, 150 are well within the scope of the present invention.

A camera 160, located within the second module 150, captures a representation of the user 120. While the camera 160 is illustrated as being integral with the second module 150, the camera 160 may be contained in a chassis separate from, but associated with, the second module 150. The communications circuitry transmits the video representation of the user 120 between the first and second modules 140, 150 and, then, to a second user across a communications network (see FIG. 7). Concurrently, a video representation of the second user is transmitted to the multimedia telephone 110 for display on a screen 170 of the television set 130.

The multimedia telephone 110 includes user interface controls 180 for communicating audio control information with the user 120. The key pad unit interface 185 may, alternatively, be a remotely-controlled interface employing the television screen 170 for a display, and may thereby be associated with the second module 150. The key pad unit interface 185, however, is illustrated as being associated with the first module 140 and is proximate the user 120 to retain the familiar interface of a conventional telephone. The key pad unit interface 185 is operative to receive dialing information from the user 120, and may alternatively take the form of a conventional suitably arranged keyboard.

The first module 140 also includes a handset with an integrated speakerphone 190 for communicating voice data, simultaneously with the video data, across the communications network to the second user. The handset 190, a staple of conventional telephones, is a familiar interface for users and provides enhanced privacy for conversations. The multimedia telephone 110 therefore preferably provides a natural dialing interface and a handset 190 for audio privacy, while employing a standard television set 130 for videotelephony service.

As previously described, the present invention may locate the "intelligence" of the multimedia telephone 110 in the first module 140 or the second module 150. FIGS. 2-5 illustrate the first alternative; FIG. 6 illustrates the second alternative.

Figure 2:
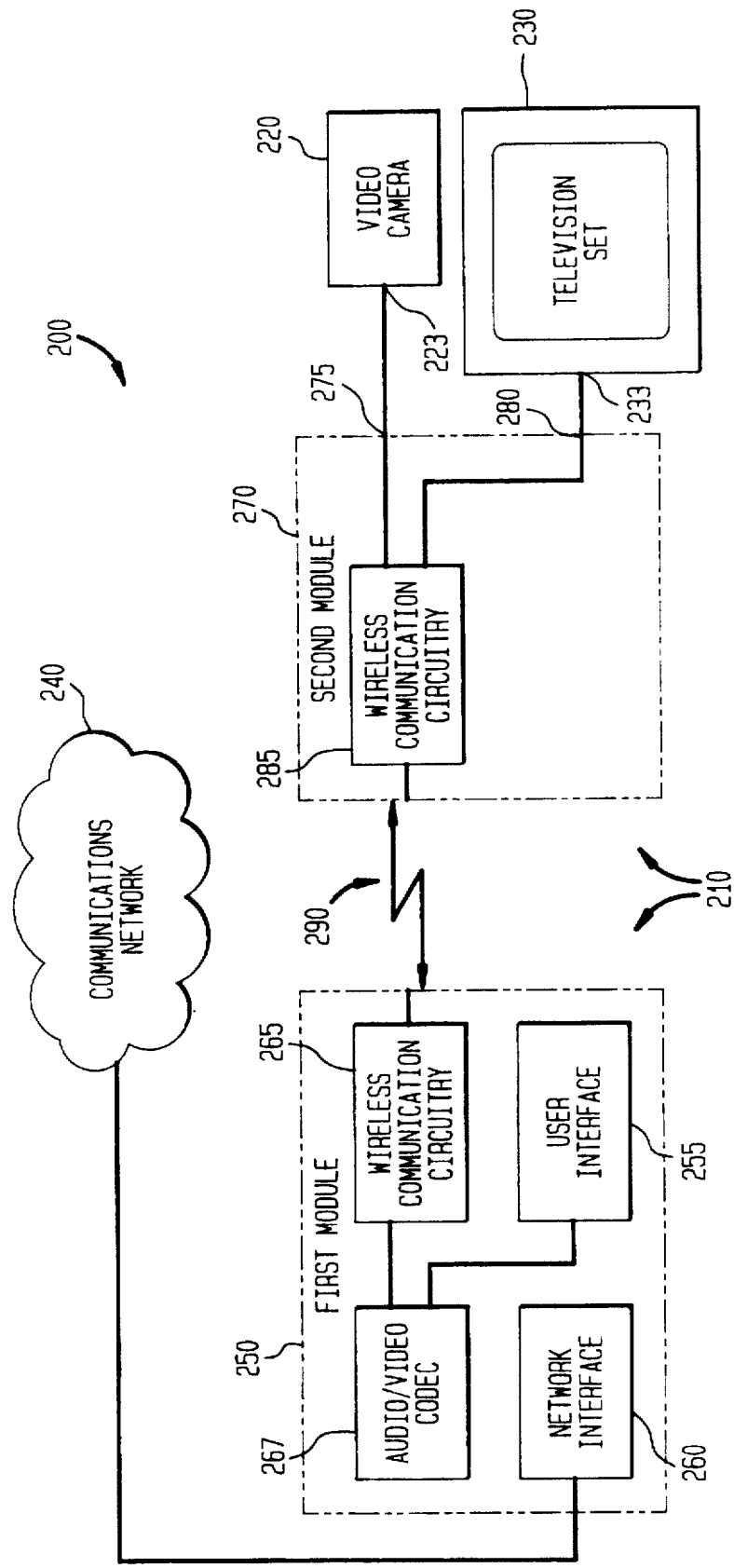
FIG. 2 illustrates a block diagram of one embodiment of a multimedia telephone according to the principles of the present invention.

Turning now to FIG. 2, illustrated is a block diagram of an interactive system (generally designated 200) employing one embodiment of a multimedia telephone (generally designated 210) according to the principles of the present invention. The interactive system 200 includes the multimedia telephone 210 along with a video camera 220, television set 230 and a communications network 240 capable of carrying voice, video and/or data. The multimedia telephone 210 includes a first module 250 having a user interface 255 for communicating audio information with a user. A network interface 260, coupled to the user interface 255, couples the first module 250 to the communications network 240. The network interface 260, along with associated telephone circuitry, user interface graphics/character generator and microprocessor (to be described), may be thought of as the "intelligence" of the multimedia telephone 210. Again, the "intelligence" may reside in either the first module 250 or the second module 270. Finally, an audio/video CODEC 267 provides audio and video compression and decompression and is coupled to first module wireless communication circuitry 265.

The multimedia telephone 210 also includes a second module 270, physically separated from the first module 250. The second module 270 includes a video input 275 connectible to an output 223 of the video camera 220, for receiving video information from the video camera 220. The second module 270 further includes a video output 280, connectible to an input 233 of the television set 230, for transmitting video information to the television set 230. The second module 270 still further includes second module wireless communication circuitry 285 wirelessly couplable to the first module wireless communication circuitry 265. The first and second module wireless communication circuitry 265, 285 cooperate to establish a wireless video communication link 290 between the first and second modules 250, 270.

The multimedia telephone 210 typically operates as follows. First, the network interface 260 couples the multimedia telephone 210 to the communications network 240. Second, the first module 250, coupled to the network interface 260 and including the user interface 255, is activated thereby communicating audio information with the user and first module wireless communication circuitry 265. Third, the wireless communications link 290 is established with the second module 270, via the second module wireless communication circuitry 285, to facilitate the bidirectional transmission of video information between the first and second modules 250, 270.

The present invention, therefore, provides the audio privacy and dialing interface features of an ordinary telephone and the enhanced display monitor quality of the television set 230. The present invention accomplishes this combination by dividing the multimedia telephone 210 into first and second modules 250, 270 and introducing the wireless link 290 between the modules 250, 270 to allow communication of information therebetween.

Figure 3:
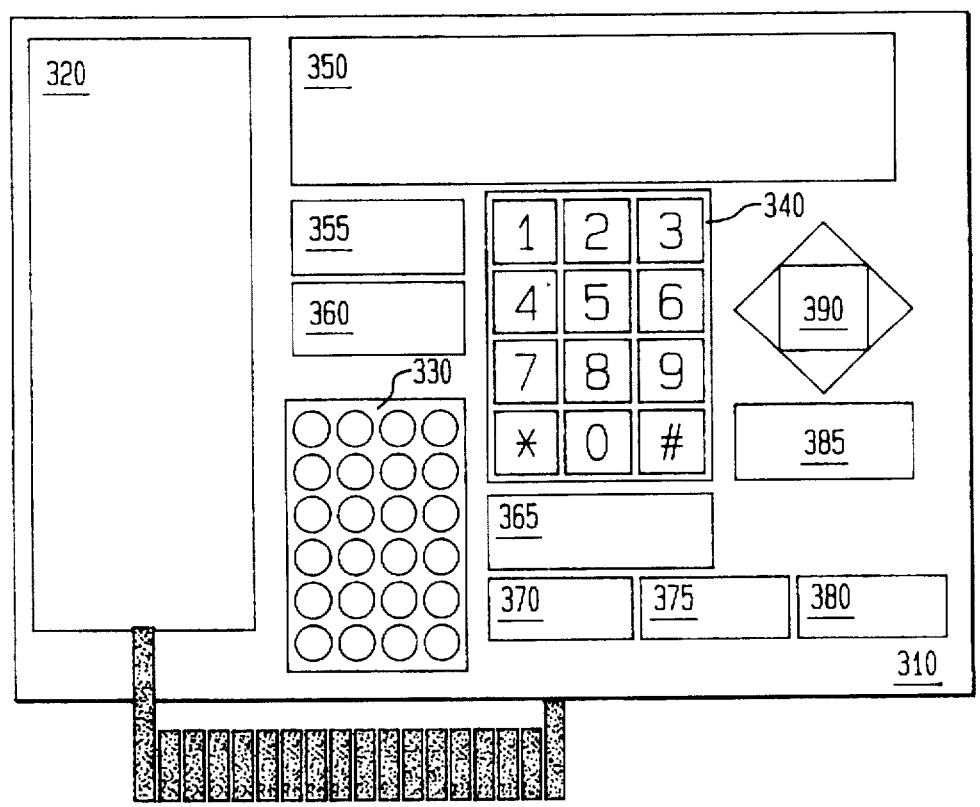
FIG. 3 illustrates a plan view of a faceplate of a first module of the multimedia telephone of FIG. 2.

Turning now to FIG. 3, illustrated is a plan view of a faceplate 310 of the first module 250 of the multimedia telephone 210 of FIG. 2. The faceplate 310 includes a handset 320 and a speakerphone 330 for communicating voice data, simultaneously with the video data, across a communications network (see FIG. 7) The faceplate 310 also includes a key pad 340 for receiving dialing information from a user. The faceplate 310 further includes a display 350 for displaying information such as the date and time of a call, and various control keys, such as: a speaker control key 355, a video control key 360, memory control keys 365, a self-view control key 370, a privacy control key 375, a mute control key 380, a menu control key 385 and cursor control keys 390.

The control keys 355, 360, 365, 370, 375, 380, 385, 390 provide a mechanism for accessing various control functions available with the multimedia telephone of the present invention. The control keys 355, 360, 365, 370, 375, 380, 385, 390 generally facilitate user interface for interactive multimedia networks and services including, without limitation, Internet access, electronic mail transfers and electronic shopping. The menu and cursor controls keys 385, 390 preferably allow the user to control a graphical user interface that appears on the television screen employed in conjunction with the multimedia telephone. The self-view control key 370 allows a user to employ a full or partial screen self-view prior to or during a call, if desired. Access to the multimedia telephone may be restricted to users with a personal identification code. The user may block his image from the view of the other party through the privacy control key 375. The memory and menu control keys 365, 385 allow a user to store and access a telephone directory for display on the display 350 of the faceplate 310 or the television screen (170 of FIG. 1). The status of a call may be monitored and displayed on the display 350 of the faceplate 310 or the television screen (170 of FIG. 1). The multimedia telephone therefore supports fully interactive multimedia communication and the handset 320 or speakerphone 330 and control keys of the faceplate 310 provide the user interface to facilitate the interactive sessions. The previously-described control keys 355, 360, 365, 370, 375, 380, 385, 390 and resulting operations are presented for illustrative purposes only, alternative embodiments of the first module 250 and additional functions are well within the scope of the present invention.

Figure 4:
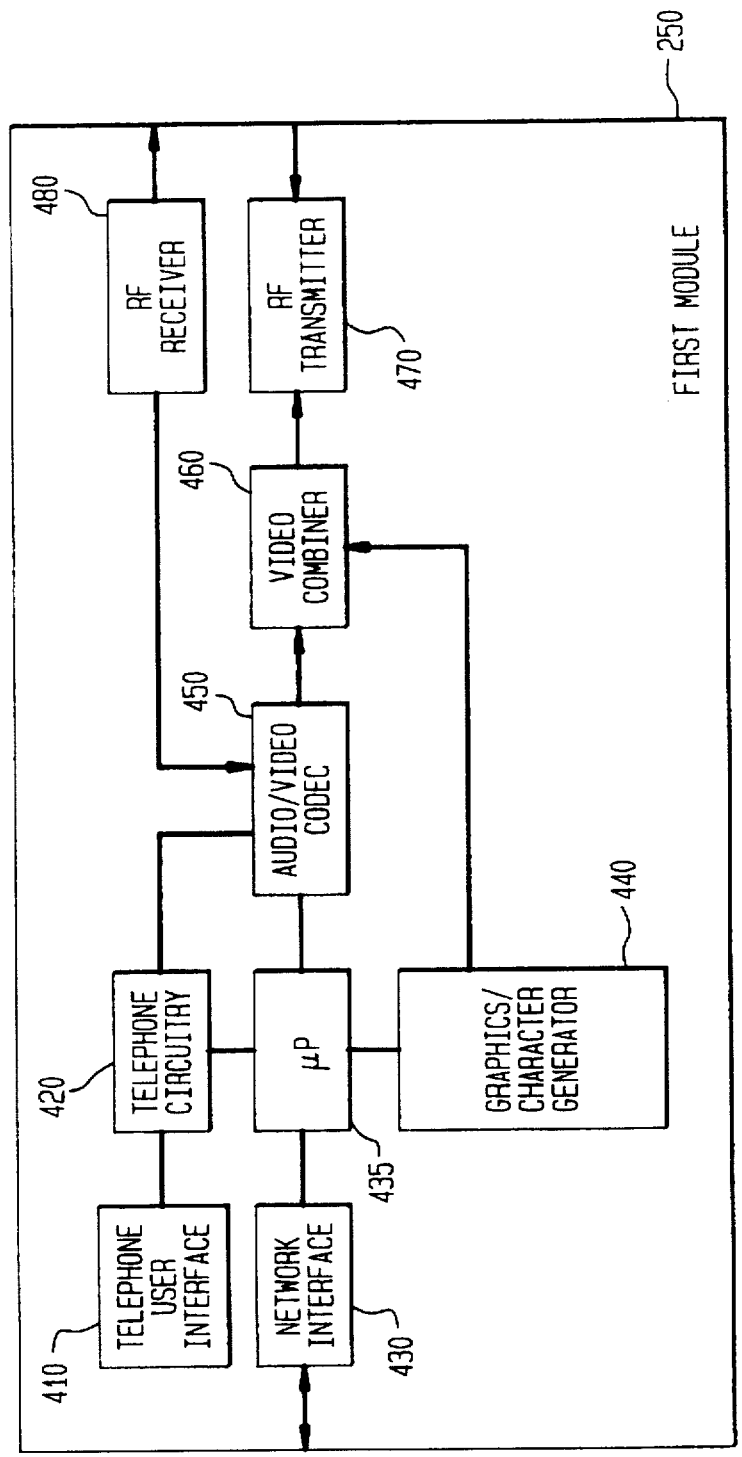
FIG. 4 illustrates a block diagram of the first module of the multimedia telephone of FIG. 2.

Turning now to FIG. 4, illustrated is a block diagram of the first module 250 of the multimedia telephone of FIG. 2. The first module 250 includes a telephone user interface 410 coupled to telephone circuitry 420 for communicating audio information with a user. The first module 250 also includes a network interface 430 for coupling the first module 250 to a communications network (see FIG. 7). The first module 250 further includes a microprocessor 435 that performs arithmetic, logic and control operations, with the assistance of an internal memory, within the first module 250. Finally, the first module 250 includes a user interface graphics/character generator 440, an audio/video CODEC 450, a video combiner 460, a radio frequency ("RF") transmitter 470 and an RF receiver 480 for wirelessly communicating video information. The audio/video CODEC 450 provides audio/video signal compression and decompression, as necessary. The video combiner 460 combines the signals from the CODEC 450 and the user interface graphics/character generator 440. Finally, the RF transmitter 470 transmits wireless RF signals to a second module (see FIG. 5) and the RF receiver 480 receives wireless RF signals from the second module.

Figure 5:
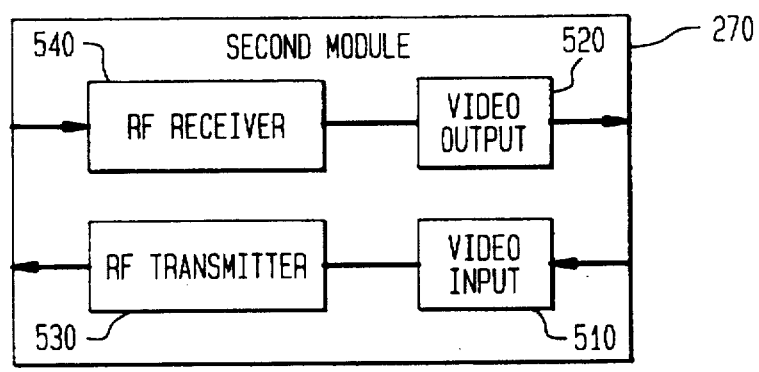
FIG. 5 illustrates a block diagram of the second module of the multimedia telephone of FIG. 2.
Figure 6:
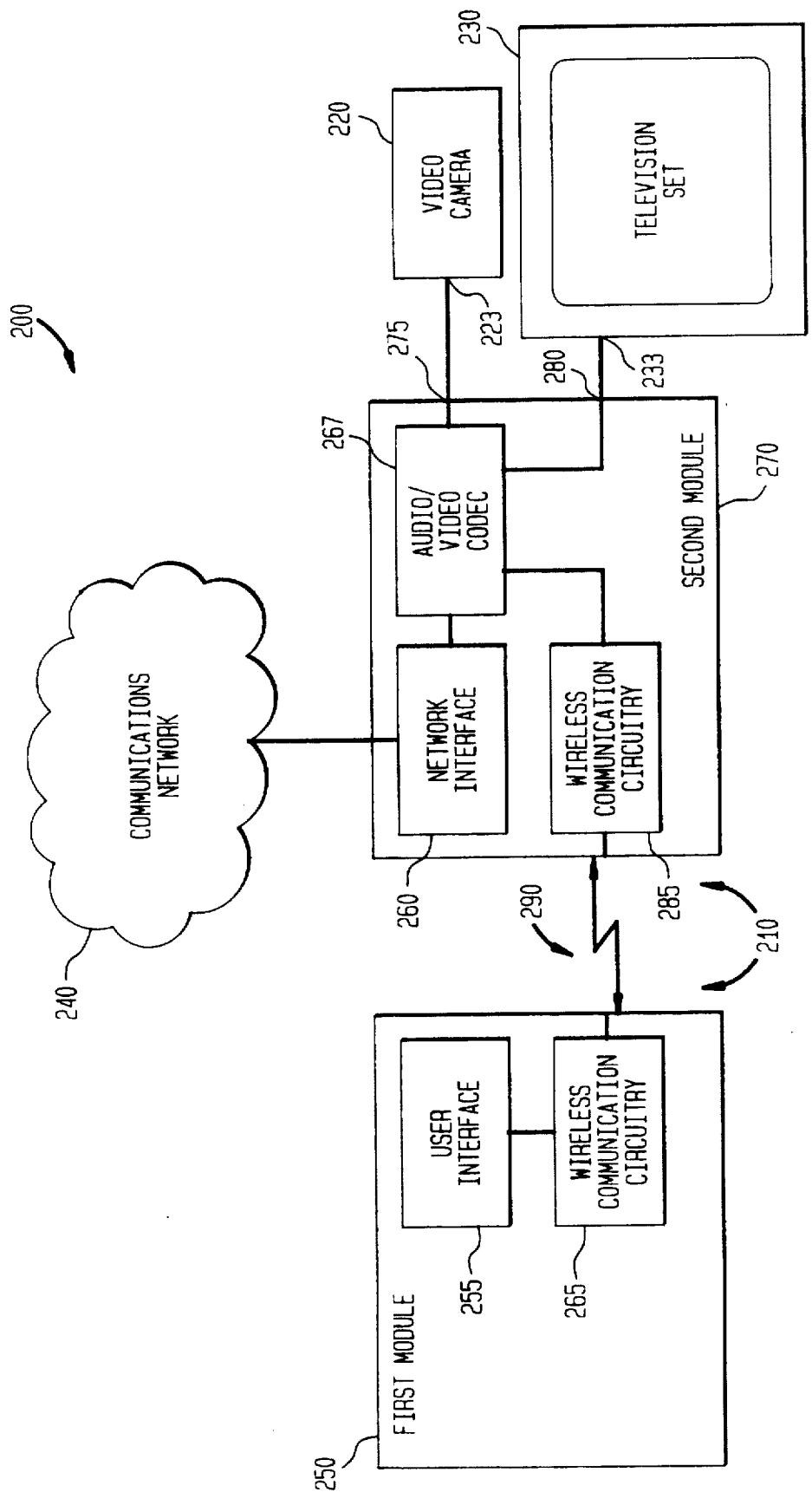
FIG. 6 illustrates a block diagram of another embodiment of a multimedia telephone according to the principles of the present invention.

Turning now to FIG. 5, illustrated is a block diagram of the second module 270 of the multimedia telephone of FIG. 2. The second module 270 includes a video input 510, connectible to a video camera (not shown), for receiving video information from the video camera. The second module 270 further includes a video output 520, connectible to a television set (not shown), for transmitting video information to the television set. An RF transmitter 530 transmits wireless RF signals to the first module 250; an RF receiver 540 receives wireless RF signals from the first module 250. As previously mentioned, those of ordinary skill in the art are aware that relatively low-power RF transmitters and receivers are commercially available at reasonable prices and provide reliable short range communication of information. This representative embodiment of the second module 500 is presented for illustrative purposes only and other embodiments that facilitate videotelephony communication are well within the scope of the present invention.

Turning now to FIG. 6, illustrated is a block diagram of another embodiment of a multimedia telephone 210 according to the principles of the present invention. As can readily be seen, FIG. 6 corresponds closely to FIG. 2, except that the network interface 260, with its associated telephone circuitry, microprocessor and "intelligence," and the audio/video CODEC 267 are relocated to the second module 270.

Figure 7:
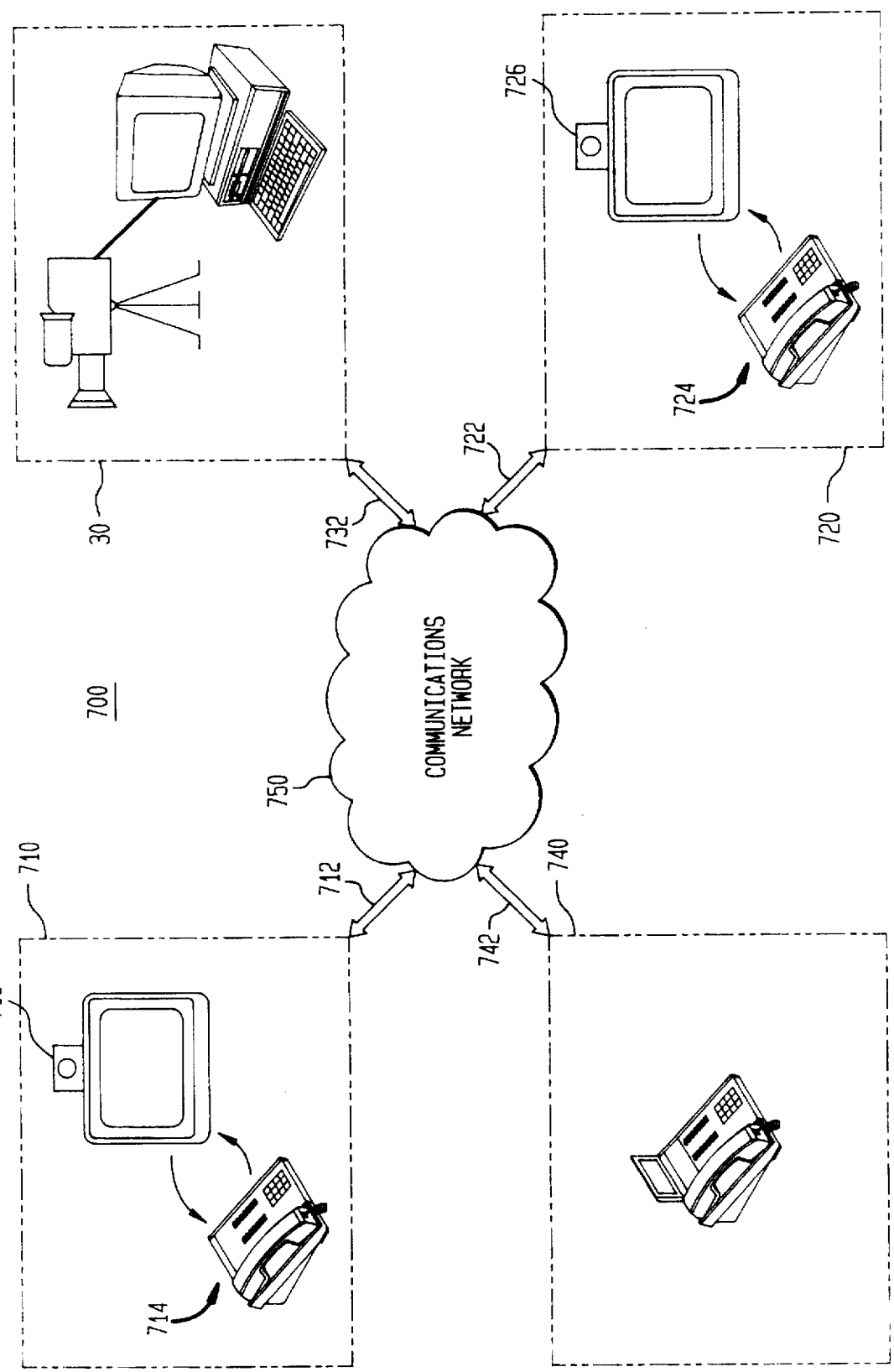
FIG. 7 illustrates a communication infrastructure, including a plurality of multimedia telephones embodying the principles of the present invention.

Turning now to FIG. 7, illustrated is a communications network 750 including a plurality of videotelephony endpoints 710, 720, 730, 740 (some of which preferably embody the principles of the present invention, but others of which may be multimedia computer systems or conventional videophones) coupled to the communications network 750 by bidirectional communication channels 712, 722, 732, 742, respectively. The endpoints 710, 720 include first modules 714, 724, respectively, and second modules 716, 726, respectively. Together, the communications network and endpoints 710, 720, 730, 740 constitute an interactive multimedia communication infrastructure 700. The communications network 750 supports the bidirectional transmission of audio and video data among the endpoints 710, 720, 730, 740.

While the communication infrastructure 700 is illustrated, those of ordinary skill in the art should understand that the techniques for employing videotelephony in accordance with the present invention may be used in conjunction with any suitably-arranged communication system, whether wired or wireless, for transmitting communication signals and any multimedia device compatible with the communication system.

Although the present invention has been described in detail, those skilled in the art should understand that they can make various changes, substitutions and alterations herein without departing from the spirit and scope of the invention in its broadest form.

What is claimed is:

1. For use with a video camera, a television set and a communications network capable of carrying voice and video data, a multimedia telephone, comprising:

a network interface for coupling said multimedia telephone to said communications network;

a first module, coupled to said network interface and including a user interface for communicating audio information with a user and first module wireless communication circuitry; and a second module separable from said first module, coupled to said network interface and including (a) a video input, connectible to said video camera, for receiving video information from said video camera, (b) a video output, connectible to said television set, for transmitting video information to said television set, and (c) second module wireless communication circuitry coupled to said camera input and said television output and wirelessly couplable to said first module wireless communication circuitry, said first and second module wireless communication circuitry cooperating to establish a wireless communication link between said first and second modules, said multimedia telephone embodied in said first and second modules to allow said first module to be separate from said second module and proximate said user.

2. The multimedia telephone as recited in claim 1 wherein said network interface is associated with said first module and said wireless communication link is a wireless video communication link.

3. The multimedia telephone as recited in claim 1 further comprising:

a user interface for communicating audio information with said user, and a key pad unit interface for receiving dialing information from said user.

4. The multimedia telephone as recited in claim 1 wherein one of said first and second module wireless communication circuitry includes audio/video coder/decoder (CODEC) circuitry.

5. The multimedia telephone as recited in claim 1 wherein said user interface comprises a handset.

6. The multimedia telephone as recited in claim 1 wherein said wireless communication link is a radio frequency (RF) link.

7. The multimedia telephone as recited in claim 1 wherein said video camera is contained in a chassis separate from said second module.

8. For use with a video camera, a television set and a communications network capable of carrying voice and video data, a method of operating a multimedia telephone, comprising the steps of:

coupling a network interface of said multimedia telephone to said communications network;

activating a first module, coupled to said network interface and including a user interface for communicating audio information with a user and first module wireless communication circuitry; and establishing a wireless communications link with a second module separable from said first module, coupled to said network interface and including (a) a video input, connectible to said video camera, for receiving video information from said video camera, (b) a video output, connectible to said television set, for transmitting video information to said television set, and (c) second module wireless communication circuitry coupled to said camera input and said television output and wirelessly couplable to said first module wireless communication circuitry, said first and second module wireless communication circuitry cooperating to establish said wireless communication link between said first and second modules, said multimedia telephone embodied in said first and second modules to allow said first module to be separate from said second module and proximate said user.

9. The method as recited in claim 8 wherein said network interface is associated with said first module and said wireless communication link is a wireless video communication link.

10. The method as recited in claim 8 wherein said step of activating further comprises:

communicating audio information with said user via a user interface, and receiving dialing information from said user with a key pad unit interface.

11. The method as recited in claim 8 wherein one of said first and second module wireless communication circuitry includes audio/video coder/decoder (CODEC) circuitry.

12. The method as recited in claim 8 wherein said step of activating comprises the step of lifting a handset of said multimedia telephone.

13. The method as recited in claim 8 wherein said step of establishing comprises the step of establishing a radio frequency (RF) link.

14. The method as recited in claim 8 wherein said method further comprises the step of receiving video information from said video camera, said video camera contained in a chassis separate from said second module.

15. For use with a video camera, a television set and a communications network capable of carrying voice and video data, a multimedia telephone, comprising:

a first module including:

a user interface for communicating audio information with a user, a network interface, coupled to said user interface, for coupling said main module to said communications network, and first module wireless communication circuitry, coupled to said network interface, for wirelessly communicating video information; and a second module separable from said first module and including:

a video input, connectible to said video camera, for receiving video information from said video camera, a video output, connectible to said television set, for transmitting video information to said television set, and second module wireless communication circuitry coupled to said camera input and said television output and wirelessly couplable to said first module wireless communication circuitry, said first and second module wireless communication circuitry cooperating to establish a wireless video communication link between said first and second modules, said multimedia telephone embodied in said first and second modules to allow said first module to be separate from said second module and proximate said user.

16. The multimedia telephone as recited in claim 15 wherein said user interface comprises a key pad unit interface for receiving dialing information from said user.

17. The multimedia telephone as recited in claim 15 wherein one of said first and second module wireless communication circuitry includes audio/video coder/decoder (CODEC) circuitry.

18. The multimedia telephone as recited in claim 15 wherein said user interface comprises a handset.

19. The multimedia telephone as recited in claim 15 wherein said wireless communication link is a radio frequency (RF) link.

20. The multimedia telephone as recited in claim 15 wherein said video camera is contained in a chassis separate from said second module.

* * * * *